United States Patent
Wang et al.

(10) Patent No.: US 8,074,025 B2
(45) Date of Patent: Dec. 6, 2011

(54) METHOD AND SYSTEM FOR COPYING LIVE ENTITIES OF SOURCE BLOCKS IDENTIFIED BY SOURCE LIST FOR SELECTED DESTINATION BLOCK TO SELECTED DESTINATION BLOCK OF MEMORY HEAP

(75) Inventors: Ligang Wang, Beijing (CN); Xiao Feng Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 947 days.

(21) Appl. No.: 11/954,101

(22) Filed: Dec. 11, 2007

(65) Prior Publication Data

US 2009/0150613 A1 Jun. 11, 2009

(51) Int. Cl.
*G06F 13/00* (2006.01)
(52) U.S. Cl. ............... 711/117; 711/165; 711/E12.009; 707/813; 707/814
(58) Field of Classification Search .................. None
See application file for complete search history.

(56) References Cited

U.S. PATENT DOCUMENTS

| | | | | |
|---|---|---|---|---|
| 4,989,134 | A * | 1/1991 | Shaw | 1/1 |
| 5,687,368 | A * | 11/1997 | Nilsen | 1/1 |
| 6,247,027 | B1 * | 6/2001 | Chaudhry et al. | 1/1 |
| 6,427,154 | B1 * | 7/2002 | Kolodner et al. | 1/1 |
| 6,671,707 | B1 | 12/2003 | Hudson et al. | |
| 7,167,881 | B2 * | 1/2007 | Yasuda et al. | 1/1 |
| 7,216,137 | B2 | 5/2007 | Shpeisman et al. | |
| 7,251,671 | B2 | 7/2007 | Wu et al. | |
| 7,310,718 | B1 * | 12/2007 | Liang et al. | 711/170 |
| 7,853,627 | B2 * | 12/2010 | Printezis et al. | 707/814 |

OTHER PUBLICATIONS

"Garbage Collection (computer science)". Wikepedia, last modified Oct. 22, 2007. 8 pages. Retrieved from http://en. wikipedia.org/wiki/Garbage_collecgtion%28computer_science%29.
Edwards, Daniel J. "Artificial Intelligence Project—RLE and MIT Computer Center Memo 19—LISP II Garbage Collector." 1 page.
Flood, Christine H. et al. "Parallel Garbage Collection: for Shared Memory Multiprocessors." USENIX JVM Conference, Apr. 2001. 10 pages.
"Dynamic Memory Allocation." Wikipedia, last modified Oct. 1, 2007. 3 pages. Retrieved from http://en.wikipedia.org/wiki/Dynamic_memory_allocation.
Knuth, Donald E. The Art of Computer Programming, Third Edition. Copyright 1997. pp. 408-423.
Li, Xiao-Feng. On runtime technology and programming languages. "Sequential in-place compacting garbage collectors". Blog, Apr. 3, 2007, 3 pages. Retrieved from http://xiao-feng.blogspot.com/2007/04/sequential-compacting-garbage-collector.html.
International application, PCT/CN2006/002528, filed Sep. 26, 2006. Li, Xiao Feng et al. 30 pages.

* cited by examiner

*Primary Examiner* — Hetul Patel
(74) *Attorney, Agent, or Firm* — Trop, Pruner & Hu, P.C.

(57) ABSTRACT

A memory manager that compacts a memory heap and reclaims space allocated to dead entities is disclosed. The memory manager may include threads of a first phase, threads of a second phase, and threads of a third phase. The threads of the first phase may assign a target address to each live entity of the memory heap. The thread of the second phase may update references of the memory heap based upon the target address for each live entity. The threads of the third phase may copy each live entity of the memory heap to its target address.

17 Claims, 4 Drawing Sheets

METHOD AND SYSTEM FOR COPYING LIVE ENTITIES OF SOURCE BLOCKS IDENTIFIED BY SOURCE LIST FOR SELECTED DESTINATION BLOCK TO SELECTED DESTINATION BLOCK OF MEMORY HEAP

BACKGROUND

In computer science, garbage collection refers to a form of automatic memory management. The basic operation of a garbage collector is to i) identify dead entities such as objects or data of a program that will not be accessed in the future, and ii) reclaim the resources used by the identified dead entities while retaining live entities such as objects or data that may be accessed in the future.

Garbage collection generally frees a programmer from having to worry about releasing objects that are no longer needed, thus enabling the programmer to focus on other aspects of the design effort. Garbage collection may also make programs more stable because garbage collection may prevent several classes of runtime errors. For example, garbage collection may prevent dangling pointer errors that result from using a reference to a deallocated object or dead entity. Many computer languages provide garbage collection as part of the language specification (e.g. C#, Java, and many scripting languages). Other languages (e.g., C, C++) designed for manual memory management may also provide garbage collectors via support libraries or other add-on modules.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Figure 1:
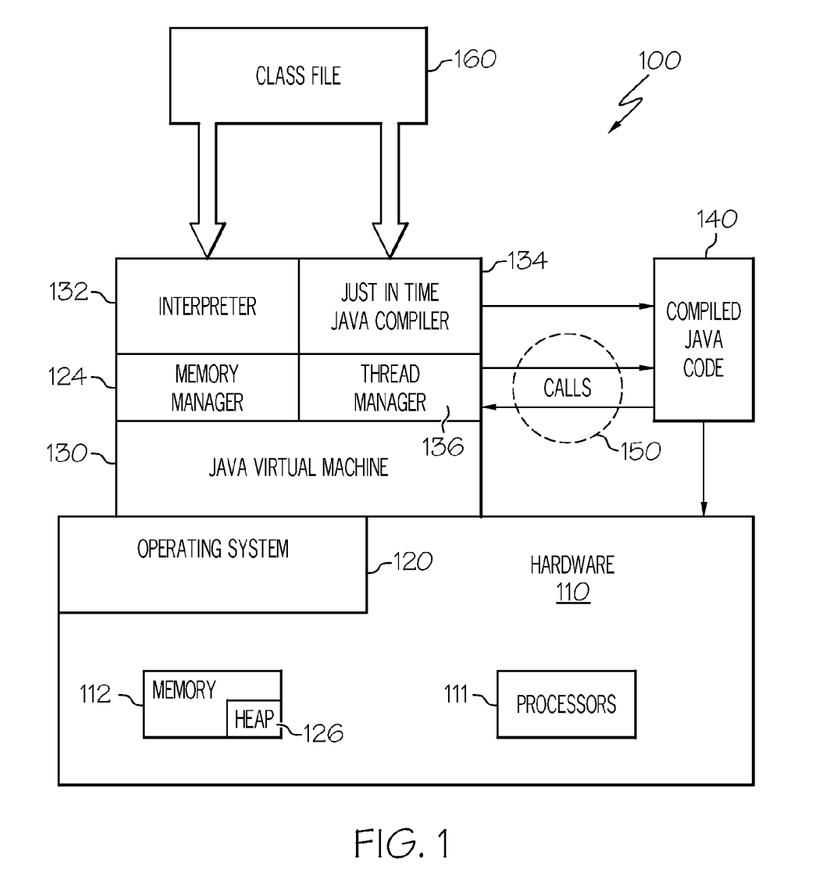
FIG. 1 shows an embodiment of a computing device having a memory manager and a heap.

An embodiment of a computing device 100 is shown in FIG. 1. The computer device 100 may include computer hardware 110 controlled by one or more operating systems 120. The computer hardware 110 may comprise processors 111 to executed the operating systems 120 and/or other applications of the computing device 100 and may include memory 112 to store programs executed by processors 111 and data processed by processors 111. The processors 111 may include one or more processing cores each supporting at least one thread of execution. Each processing core may further support multiple threads of execution. Thus, the computing device 100 may support concurrent threads of execution via a single processor 111 that has multiple processing cores or a single core that supports multiple threads of executions. The computing device 100 may also support concurrent threads of execution via multiple processors 111.

The computing device 100 may also include a memory manager 124. The memory manager 124 may dynamically allocate storage locations from a heap 126 of memory 112 in response to executing instructions of a program. The memory manager 124 may also dynamically reclaim storage locations of the heap 126 associated with dead entities and/or other dead data during the course of executing a program.

As shown, the memory manager 102 may be incorporated into a Java virtual machine (VM) 130. However, the memory manager 102 may also be incorporated into virtual machines or runtime systems of other dynamic computer languages such as Lisp, Perl, Python, Ruby, and C#. The memory manager 102 may also be incorporated into libraries or modules for historically compiled languages such as C, C++, Objective C, Pascal, and Fortran in order to provide automated memory management capabilities to such languages.

As shown, the Java VM 130 may include a Java interpreter 132 that translates and executes Java source code and/or Java bytecode provided by class files 160. The Java VM 130 also include a Just-In-Time (JIT) Java compiler 134 that compiles Java source code and/or Java bytecode provided by class files 160 into compiled Java code 140 that includes native instructions that may be directly executed by processors 111. In order to maintain the state of the Java VM 130 and make system calls, the compiled Java code 140 may make calls 150 into the Java VM 130. Likewise, the Java VM 130 may call compiled Java code 140 to cause it to execute on the computer hardware 110.

The Java VM 130 may also include a thread manager 136 that manages multiple threads of execution. As explained in more detail below, the memory manager 124 may leverage the multi-threaded capabilities provided by the thread manager 136 and the Java VM 130 in order to parallelize a memory compaction process. In particular, the memory manager 124 may dynamically allocate and dynamically deallocate portions of the memory heap 126 as a program executes, thus relieving the programmer from many aspects of memory management. When a program runs low on heap space 126, the memory manager 124 may determine the set of live entities such as objects or other data that the program may still access. The space used by dead entities such as objects or other datum that will no longer be accessed is freed by the memory manager 124, thus making the space available for future use.

The memory manager 124 may employ a three phase, sliding compactor process to compact the heap 126. During the compaction process, the memory manager 124 partitions the heap 126 into fixed sized blocks. For example, the memory manager 124 may partition the heap 126 into blocks having a size of 32 kilobytes (KB), though other sizes may be used as well. Each block of the heap 126 is a source block whose live entities are copied to new locations in the heap 126. Each block of the heap 126 may also be a destination block to which live entities of the source blocks are copied.

In Phase 1, threads of the memory manager 124 may work in parallel to assign a target address to each live entity of the heap 126. The threads of the memory manager 124 may further construct a source list for each destination block of the heap 126. Each source list may record source blocks of the heap 126 that contain live entities to be copied to the associated destination block during Phase 3.

In Phase 2, threads of the memory manager 124 may work in parallel to traverse the heap 126 and re-point all references of the source blocks to target addresses of the destination blocks. For example, a live entity may have a reference to another entity that has a current address of X but will be moved to a target address of Y during Phase 3. Accordingly, the threads of the memory manager 124 may update the reference such that it points to the new location of the object at target address Y.

In Phase 3, the threads of the memory manager 124 may work in parallel to move the live entities from one end of the heap 126 through the other end of the heap 126 based upon the source lists constructed for each destination block. The threads of the memory manager 124 ensure that when an object is copied to its new location in the heap 126 as indicated by its target address, any live entities that were located at this new location have already been copied to new locations in the heap 126 in order to ensure no data loss in the process.

Figure 2:
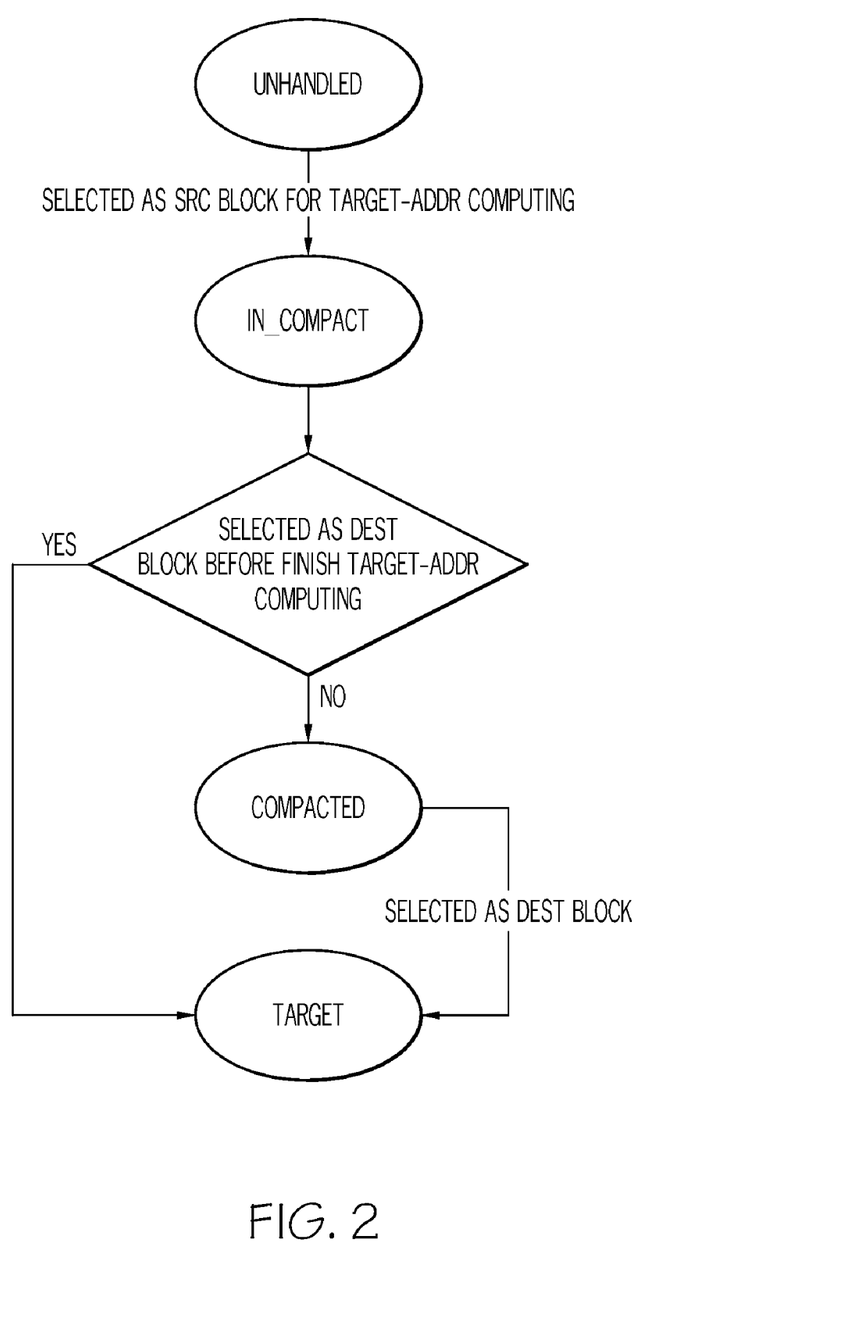
FIG. 2 shows embodiments of states and state transitions for blocks of the heap.
Figure 3:
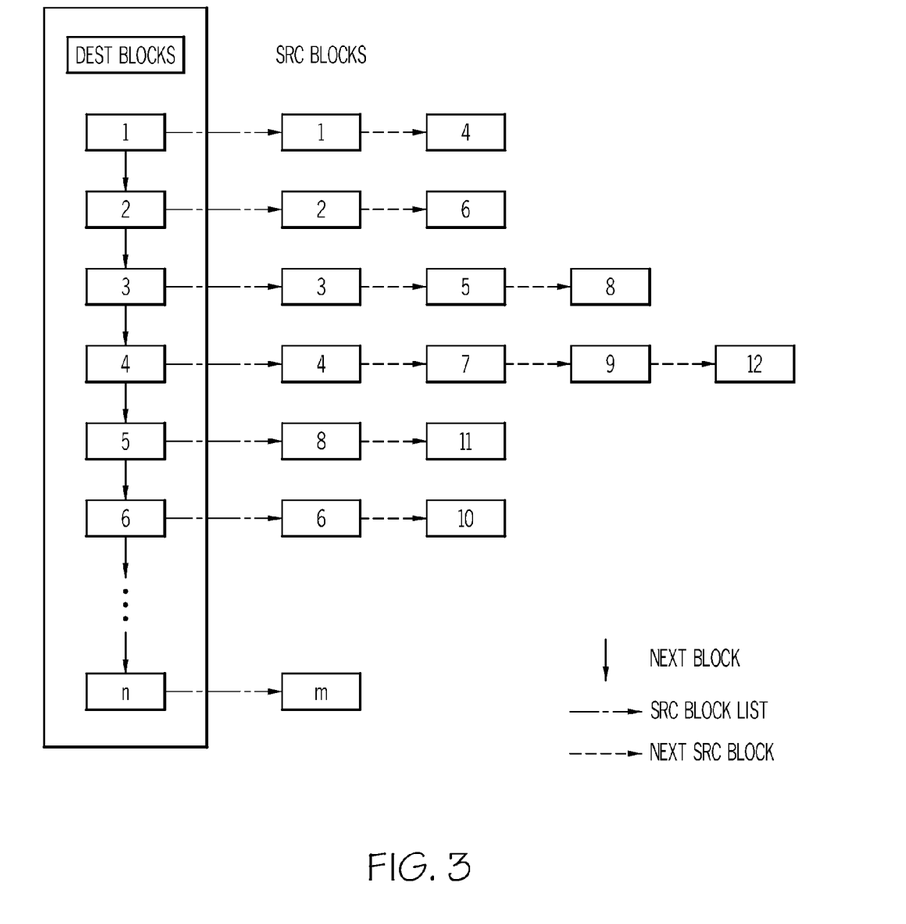
FIG. 3 shows an embodiment of source lists of the blocks of the heap.

Turning now to FIGS. 2 and 3, additional details regarding Phase 1 of the compaction process are shown. In particular, FIG. 2 shows an embodiment of states and state transitions of the blocks that comprise the heap 126. As shown, the blocks of the heap 126 may be in an UNHANDLED state, an IN_COMPACT state, a COMPACTED state, or a TARGET state. At the beginning of Phase 1, all blocks of the heap 126 have an UNHANDLED state that indicates that the respective block has yet to be grabbed by a thread for use as a source block or as a destination block. A block that has been grabbed by a thread for use as a source block enters the IN_COMPACT state. In particular, the IN_COMPACT state reflects that compaction of the source block has begun with the thread assigning target addresses to the live entities of the source block. The COMPACTED state reflects that a thread as completed the processes of assigning target addresses to each of the live entities of the block. Finally, the TARGET state reflects that a thread has grabbed the block for use a destination block into which live entities will later be copied.

As mentioned above, each block of the heap 126 at the start of Phase 1 of the compaction process is in the UNHANDLED state. During Phase 1, threads of the memory manager 124 compete for blocks of the heap 126. In particular, each such thread attempts to grab a source block and then a destination block of the heap 126 in a specified heap order. Each thread first attempts to grab the first UNHANDLED block of the heap for use as a source block for the thread. The thread that successfully grabs the first UNHANDLED block updates the blocks state to IN_COMPACT to indicate that target addressing as begun for the live entities of the grabbed source block. The other threads then attempt to grab the next UNHANDLED block of the heap 126 for use as a source block for the respective thread. The next UNHANDLED block is defined by a heap order set by the memory manager 124. The heap order as explained in more detail below defines an order for the blocks of the heap 126.

After grabbing an UNHANDLED block of the heap 126 for use as a source block, the thread also attempts to grab a COMPACTED block of the heap 126 for use as a destination block. In particular, the thread attempts to grab the first COMPACTED block as defined by the heap order that precedes the source block. If a COMPACTED block is grabbed, the thread updates the grabbed block's state to the TARGET state to indicate that the block is a destination block. However, if the thread is unable to grab a COMPACTED block that precedes the source block in the heap order, then the thread uses its source block as a destination block as well. Accordingly, the thread updates the block's state from the IN_COMPACT state to the TARGET state.

The thread then assigns target addresses to the live entities of its source block that correspond to memory locations of its destination block. Furthermore, the thread adds the source block to a source list associated with its destination block. The thread also updates a destination count associated with the source block that maintains a destination count. In one embodiment, the destination count for each source block is initialized to 0 and incremented by 1 each time the source block is added to a source list for a destination block. Accordingly, the destination count of a source block indicates how many source lists contain the source block. Moreover, since each destination block has one source list, the destination count also indicates to how many destination blocks live entities of the source block will be copied in Phase 3. For example, as shown in FIG. 3, block 4 would have a destination count of 2 after Phase 2 since block 4 is in the source list of destination block 1 and in the source list of destination block 4. Similarly, block 2 would have a destination count of 1 after Phase 2 since block 2 is only in the source list of destination block 2.

If the thread finishes assigning target addresses to each live entity of its source object, then the thread attempts to grab another UNHANDLED block as described above for use as another source block for its destination block. In which case, the thread adds the newly acquired source block to the source list associated with its destination block. Thus, as shown in FIG. 3, the source list for a particular destination block may have more than one source block. For example, the source list for destination block 1 includes source block 1 and source block 4.

Conversely, if the thread fills the destination block prior to assigning a target address to each of the live entities of its source block, then the thread attempts to grab another destination block in the manner mentioned above. In particular, the thread attempts to grab the next COMPACTED block that precedes its source block and failing that uses its source block as a destination block. The thread then adds its current source block to a source list for its current destination block. Thus, as shown in FIG. 3, a source block may be listed in more than one source list and thus contain live entities for more than one destination block. For example, source block 4 of FIG. 3 is shown in the source list for destination block 1 and the source list for destination block 4.

In this manner, each thread of the memory manager 124 used to implement Phase 1 of the compaction process continues to grab source blocks and destination blocks and process them accordingly until all live entities of the heap 126 or a portion of the heap 126 to be compacted have been assigned a target address. Each live entity therefore has a target address and each destination block has a source list that identifies source blocks having live entities to be copied to the respective destination block.

After Phase 1 is completed, multiple threads of the memory manager 124 may implement Phase 2 of the compaction process. In general, the multiple threads of Phase 2 may work in parallel to traverse the heap 126 and re-point references of the source blocks to the destination blocks based upon target addresses assigned to the live entities of the source blocks. The threads of Phase 2 may grab blocks from the heap 124 in the heap order used during Phase 1. In particular, each thread of Phase 2 may attempt to grab the next block in the heap order and may locally update the references of its grabbed block. The threads of Phase 2 may employ the use of a global block index or block address or a chaining pointer in every block that points to its successive block to ensure each thread grabs the next block in the heap order. After Phase 2 is complete, references of the source blocks have been updated to point to where the referenced objects will reside in the heap 124 after Phase 3 copies the live entities from the source blocks to the destination blocks.

The memory manager 124 begins Phase 3 of the compaction process after completing Phase 2. In Phase 3, multiple threads of the memory manager 124 may work in parallel to move the live entities from the source blocks to the destination blocks. As a result of moving the live entities, the memory manager 124 may compact the heap 126 and create one or more areas of contiguous free space. Moreover, the memory manager 124 may reclaim space previously allocated to dead entities as a result of copying live entities to locations previously occupied by dead entities.

The memory manager 124 in Phase 3 selects the first destination block to be shared by the threads of Phase 3. Each thread then attempts to grab a source block from the source list of the shared destination block. If a thread grabs a source block from the source list of the shared destination block, the thread then copies the live entities that have target addresses in the shared destination block to locations in the shared destination block identified by the target addresses. Since a source block may reside in source lists of two destination blocks, live entities having target addresses corresponding to the other destination block are not copied at this time. Such live entities are copied when the memory manager 124 selects their respective destination block as the shared destination block for the threads of Phase 3. After copying the appropriate live entities of the source block to the shared destination block, the thread decrements the destination counter of the source block and attempts to grab another source block from the source list of the shared destination block.

When the source blocks in the source list for the shared destination block have been grabbed by the threads, a thread of Phase 3 that has no source block to process or has processed its source block selects a new shared destination block and then attempts to grab a source block from the source list of the new shared destination block. The thread however only selects the next shared destination block if its destination counter is 0, thus indicating that live of the block has already been copied to a previous destination block. The thread may also select a block for the next shared destination block if it has a destination count of 1 and the first block in its source-list is itself. For example, as shown in FIG. 4, thread 1 may select block 3 for the shared destination block after processing of shared destination block 2 is completed even though the destination count of block 3 is 1 since block 3 is the first source block of its source list.

Figure 4:
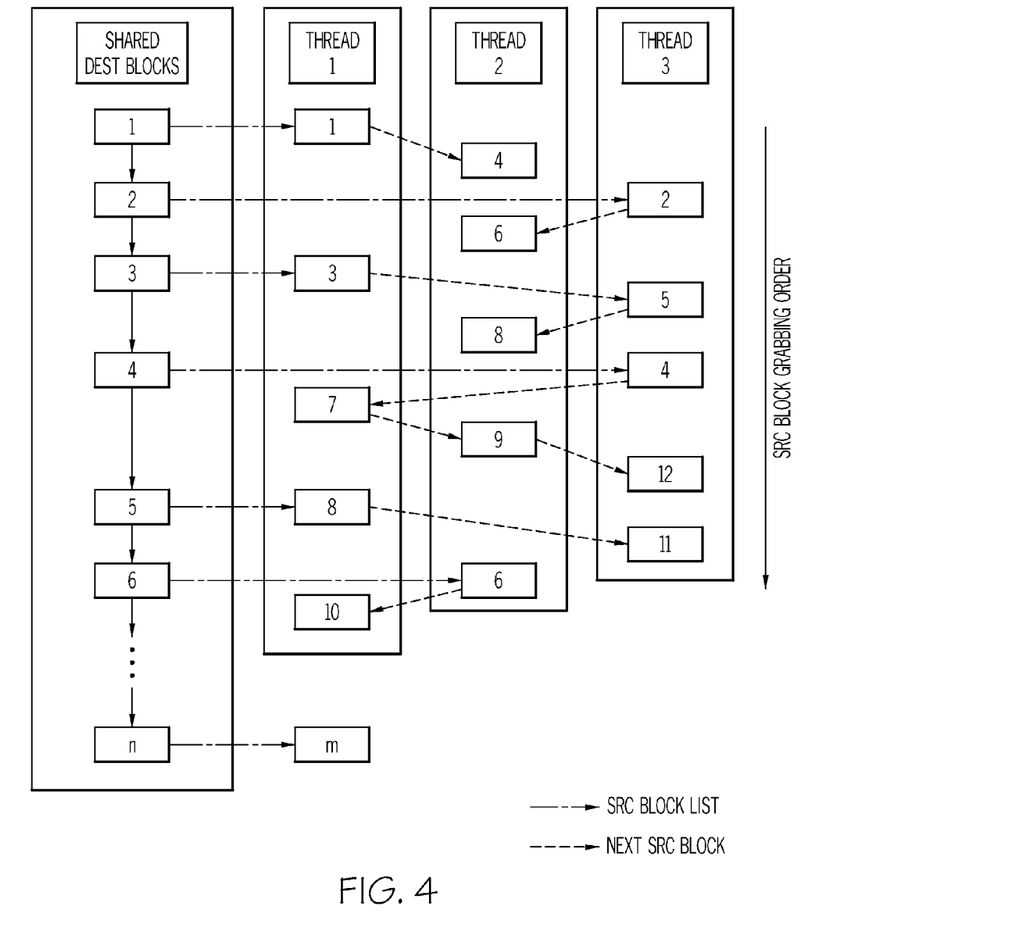
FIG. 4 shows an embodiment of threads processing the source lists.

An illustrative run through Phase 3 is shown in FIG. 4 using three threads and the source lists of FIG. 3. At the start of Phase 3, block 1 has a destination count of 1 but is the first source block in the source list for block 1. Accordingly, the memory manager 124 selects block 1 as the first shared destination block. Based upon the source list of the first shared destination block, thread 1 grabs source block 1 and thread 2 grabs source block 4. As there are no other source blocks of the shared destination block, thread 3 selects a new shared destination block 2. Thread 3 grabs the first source block of block 2, which is block 2 itself, and copies the live objects to the new locations specified by their target addresses. Once getting a source block, each thread copies the live objects in the source block to their new locations specified by their target addresses, and decrements the destination count of the source block. Thread 1 and thread 2 copy the live objects in block 1 and block 4 respectively and decrement the destination count for each. In particular, thread 2 only copies the live objects of block 4 that have target addresses in block 1.

When a thread finishes copying all the live objects in its source block that have target addresses in its current destination block, it continues to grab a source block on the source list of the shared destination block. In particular, when thread 2 finishes processing block 4, and the current shared destination block is block 2 whose first source block (i.e., block 2) is already grabbed by thread 3, thread 2 grabs the next source block (i.e., block 6) in the source list. Thread 3 and thread 2 copy the live objects of blocks 2 and 6 to the shared destination block 2 respectively and decrement the destination count for each. As there are no additional blocks of the shared destination block, when thread 1 finishes processing its source block 1, it continues to select next shared destination block, i.e., block 3, which is the next block in the heap order used in Phases 1 and 2 despite block 3 having a destination count of 1 since block 3 is the first block in the source list for block 3.

Based upon the source list of the shared destination block 3, thread 1 grabs source block 3, thread 3 grabs source block 5, and thread 2 grabs source block 8. Thread 1, thread 3, and thread 2 copy the live objects of blocks 3, 5 and 8 to the shared destination block 3 and decrement the destination count for each. After thread 3 finishes copying live entities to block 3, thread 3 selects the next shared destination block. In particular, thread 3 selects block 4 which is the next block in the heap order used in Phases 1 and 2 despite block 4 having a destination count of 1 since block 4 is the first block in the source list for block 4. The threads of Phase 3 continue to select a shared destination block and process the source list of the selected destination block until all destination blocks have been processed.

As mentioned above, the live entities in Phase 3 are copied to their target addresses. Accordingly, selecting a destination block that precedes or is the same as the source block in the heap order used in Phases 2 and 3 ensures that the live entities are still in the heap 126 after Phase 3 of the compaction process. In one embodiment, the memory manager 124 may use a simple increasing heap address order for the heap order. Each location of the heap 126 has an associated address of the memory 112. Accordingly, each block of the heap 124 starts at a corresponding address of the memory 112. Thus, the heap address order starts with the block having the smallest heap address and proceeds to the block having the largest heap address. Such an embodiment, results in live entities being moved toward the lower end (e.g. lower memory addresses) of the heap 126 and creating an area of contiguous free space toward the upper end (e.g. higher memory addresses) of the heap 126. It should be noted the memory manager 124 may also use a decreasing heap address order thus starting from the upper end of the heap 126 a moving toward the lower end of the heap. Such an embodiment, results in live entities being moved toward the upper end and free space toward the lower end.

In another embodiment, the memory manager 124 may assign a unique index value to each block of the heap 126 or to each block of a portion of the heap 126. The memory manager 124 may assign the unique indices in an increasing heap address order in which case the threads essentially grab blocks of the heap in increasing heap address order. Such an embodiment results in the heap being compacted toward the beginning of the heap address space and generating a free area toward the end of the heap address space. However, the memory manager 124 may instead assign the unique indices to the blocks of the heap 126 in another order so as to result in a different location for the free area or result in multiple free areas. For example, if the heap 126 only contains blocks 0, 1, 2, 3, 4, 5, 6 and 7, the memory manager 124 may respectively assign the blocks 0, 1, 2, 3, 4, 5, 6 and 7 the indices 0, 2, 4, 6, 7, 5 3, and 1. Thus, if the live entities only require 4 blocks for storage, compacting the heap 126 in increasing heap index order may result in the live entities being stored in blocks 0, 7, 1, and then 6 thus leaving a contiguous free space in the middle of the heap 126 at blocks 2-5. Thus, the memory manager 124 by the manner it elects to assign indices to the blocks of the heap 126 may control the distribution of the live entities in the heap 124 and the location of free space in the heap 126.

In yet another embodiment, all the blocks in heap 126 or in a portion of heap 126 may be chained with pointers. Each block may have a pointer value that points to its successive block. The pointer may be referred as the "next pointer". The next pointers of the blocks chain the blocks from the first through the last one, composing the heap order. The next pointers may chain the blocks in the same order as heap address increasing order, which results in a continuous free area in one end of the heap address space. However, the next pointers may chain the blocks in different orders, resulting in a different location for the free area or result in multiple free areas.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

What is claimed is:

1. A method, comprising
generating a source list for each destination block of a plurality of destination blocks, each source list to identify one or more source blocks of a memory heap that has at least one live entity to be copied to the respective destination block of the memory heap,
selecting a destination block of the plurality of destination blocks, and
copying live entities of the one or more source blocks identified by the source list for the selected destination block to the selected destination block of the memory heap.

2. The method of claim 1, further comprising
selecting a next destination block of the plurality of destination blocks that follows the selected destination block in a heap address order after the copying to the selected destination block, and
copying to the selected next destination block the live entities of the source blocks identified by the source list for the selected another destination block.

3. The method of claim 1, wherein generating a source list for each destination block of a plurality of destination blocks comprises executing a plurality of threads, each thread in response to being executed
grabbing a source block and a destination block of the memory heap,
assigning to each live entity of a grabbed source block a target address in a grabbed destination block, and
attempting to grab another source block after assigning a target address to each live entity of the grabbed source block.

4. The method of claim 1, wherein generating a source list for each destination block of a plurality of destination blocks comprises executing a plurality of threads, each thread in response to being executed
grabbing a source block and a destination block of the memory heap,
assigning to each live entity of a grabbed source block a target address in a grabbed destination block, and
attempting to grab another destination block after the assigning fills the grabbed destination block.

5. The method of claim 1, wherein generating a source list for each destination block of a plurality of destination blocks comprises executing a plurality of threads, each thread in response to being executed
grabbing a block of the memory heap that has a state of unhandled for use as a source block,
grabbing a block of the memory heap that has a state of compacted and that precedes the grabbed source block in a heap order for use as a destination block,
assigning to each live entity of the grabbed source block a target address in the grabbed destination block, and
after assigning a target address to each live entity of the grabbed source block, updating the state of the grabbed source block to compacted and attempting to grab another block of the memory having a state of unhandled for use as a source block.

6. The method of claim 1, wherein generating a source list for each destination block of a plurality of destination blocks comprises executing a plurality of threads, each thread in response to being executed grabbing a block of the memory heap that has a state of unhandled for use as a source block,
grabbing a block of the memory heap that has a state of compacted and that precedes the grabbed source block in a heap order for use as a destination block,
assigning to each live entity of the grabbed source block a target address in the grabbed destination block, and
after assigning fills the grabbed destination block with live entity, attempting to grab another block of the memory having a state of compacted for use as a destination block.

7. The method of claim 1, wherein copying live entities of the one or more source blocks comprises executing a plurality of threads, each thread in response to being executed
grabbing a source block of the one or more source blocks, and
copying live entities of the grabbed source block to the selected destination block of the memory heap.

8. The method of claim 1, further comprising
assigning each live entity of the memory heap a target address in the destination block, and
after assigning a target address to each live entity of the memory heap, executing a plurality of threads to update references of the source blocks to point to corresponding locations of the destination blocks.

9. A non-transitory machine readable medium comprising a plurality of instructions that in response to being executed result in a computing device:
executing a plurality of threads of a first phase to assign a target address to each live entity of a memory heap,
after executing the plurality of threads of the first phase, executing a plurality of threads of a second phase to update references of the memory heap based upon the target address for each live entity,
after executing the plurality of threads of the second phase, executing a plurality of threads of a third phase to copy each live entity of the memory heap to its target address;
each thread of the first phase grabbing a source block and a destination block of the memory heap, assigning to each live entity of a grabbed source block a target address in a grabbed destination block, and updating a source list associated with the grabbed destination block to include the grabbed source block, and
each thread of the third phase grabbing a source block of the source list associated with a selected destination block, and copying live entities of the grabbed source block to the selected destination block.

10. The non-transitory machine readable medium of claim 9, wherein the plurality of instructions further result in
each thread of the first phase grabbing another source block after assigning a target address to each live entity of the grabbed source block, and updating the source list associated with the grabbed destination block to include the grabbed another source block.

11. The non-transitory machine readable medium of claim 9, wherein the plurality of instructions further result in
each thread of the first phase grabbing another destination block in response to the assigning, filling the grabbed destination block with live entity of the source block, and updating a source list associated with the grabbed another destination block to include the grabbed source block.

12. The non-transitory machine readable medium of claim 9, wherein the plurality of instructions further result in
each thread of the first phase grabbing a block of the memory heap that has a state of unhandled for use as a source block, grabbing a block of the memory heap that has a state of compacted and that precedes the grabbed source block in a heap order for use as a destination block, and after assigning a target address to each live entity of the grabbed source block, updating the state of the grabbed source block to compacted, grabbing another block of the memory having a state of unhandled for use as another source block, and updating the source list associated with the grabbed destination block to include the grabbed another source block.

13. The non-transitory machine readable medium of claim 9, wherein the plurality of instructions further result in
each thread of the first phase grabbing a block of the memory heap that has a state of unhandled for use as a source block, grabbing a block of the memory heap that has a state of compacted and that precedes the grabbed source block in a heap order for use as a destination block, and after the assigning filling the grabbed destination block with live entity, grabbing another block of the memory having a state of compacted for use as a destination block, and updating a source list associated with the grabbed another destination block to include the grabbed source block.

14. A system comprising:
a memory comprising a heap and a memory manager to manage the heap, the memory manager comprising a multi-threaded first phase, a multi-threaded second phase, and a multi-threaded third phase, and
a plurality of processing cores to execute the multi-threaded first phase, the multi-threaded second phase, and the multi-thread third phase of the memory manager,
wherein:
each thread of the multi-thread first phase is to assign a target address to each live entity of the heap,
each thread of the multi-threaded second phase is to update references of the heap based upon the target address for each live entity,
each thread of the multi-threaded second phase is to copy each live entity of the heap to its target address in response to executing the multi-threaded third phase of the memory manager,
each thread of the multi-threaded first phase is to grab a source block and a destination block of the heap, is to assign to each live entity of a grabbed source block a target address in a grabbed destination block, and is to update a source list associated with the grabbed destination block to include the grabbed source block, and
each thread of the multi-threaded third phase is to grab a source block of the source list associated with a selected destination block, and is to copy live entities of the grabbed source block to the selected destination block.

15. The system of claim 14 wherein
each thread of the multi-thread first phase is to grab another source block after assigning a target address to each live entity of the grabbed source block, and is to update the source list associated with the grabbed destination block to include the grabbed another source block.

16. The system of claim 14, wherein
each thread of the multi-thread first phase is to grab another destination block in response to the assigning, is to fill the grabbed destination block with live entity of the source block, and is to update a source list associated with the grabbed another destination block to include the grabbed source block.

17. The system of claim 14 wherein
each thread of the multi-threaded first phase is to grab a block of the heap that has a state of unhandled for use as a source block, is to grab a block of the heap that has a state of compacted and that precedes the grabbed source block in a heap order for use as a destination block, and after assigning a target address to each live entity of the grabbed source block, is to update the state of the grabbed source block to compacted, is to grab another block of the memory having a state of unhandled for use as another source block, and is to update the source list associated with the grabbed destination block to include the grabbed another source block.

* * * * *